F. E. MILLS.
METHOD OF CONCENTRATING TAILINGS FROM QUARTZ-MILLS.
No. 170,289. Patented Nov. 23, 1875.
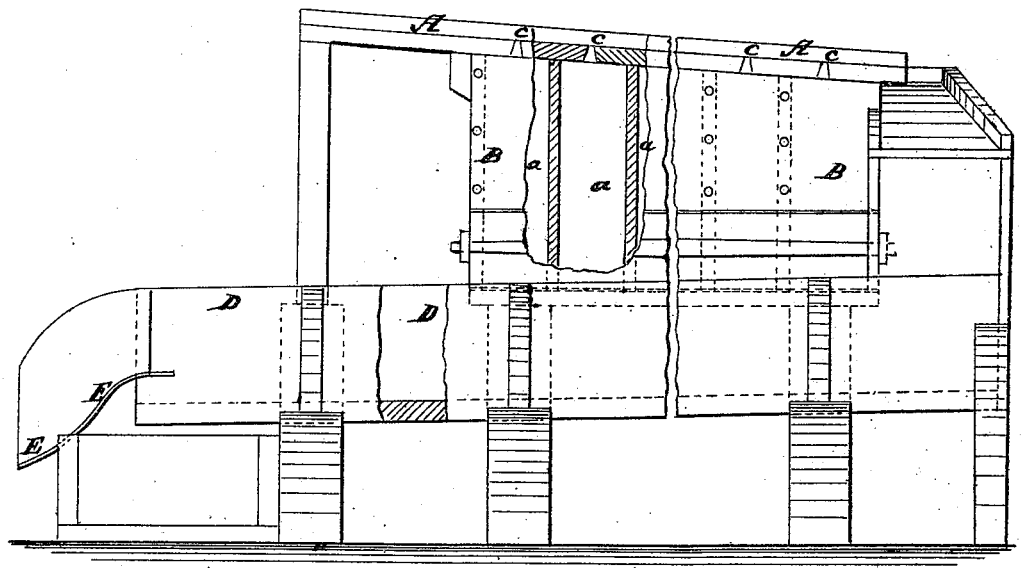
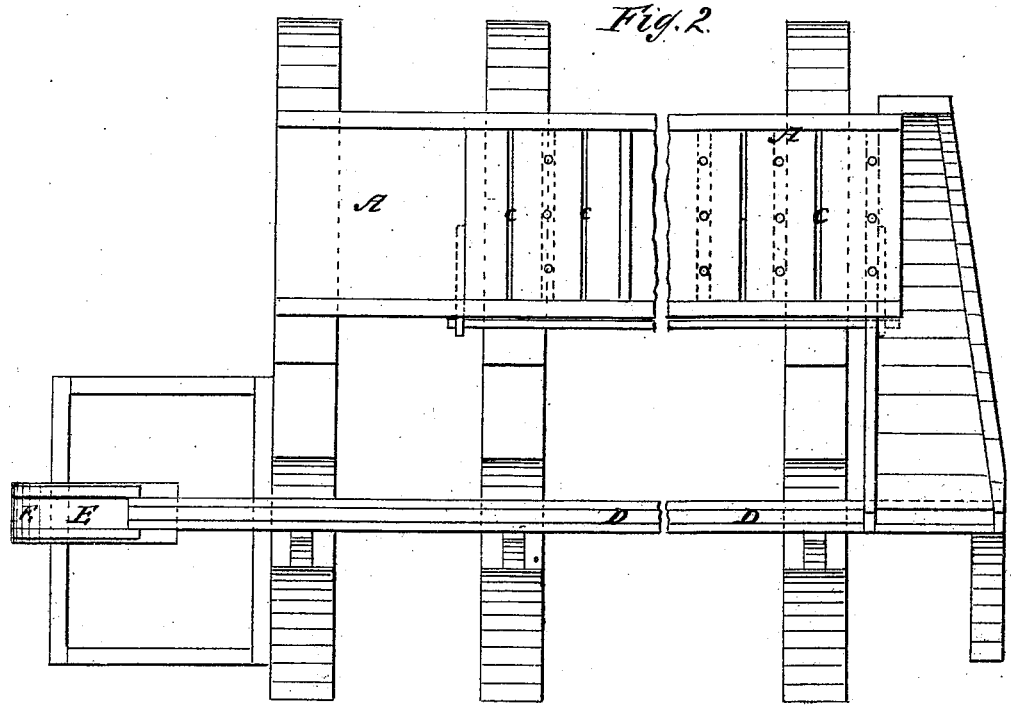

UNITED STATES PATENT OFFICE.

FRANCIS E. MILLS, OF VIRGINIA CITY, NEVADA.

IMPROVEMENT IN METHODS OF CONCENTRATING TAILINGS FROM QUARTZ-MILLS.

Specification forming part of Letters Patent No. 170,289, dated November 23, 1875; application filed March 29, 1875.

*To all whom it may concern:*

Be it known that I, FRANCIS E. MILLS, of Virginia City, in the county of Storey and State of Nevada, have invented a new and Improved Method of Concentrating Tailings from Quartz-Mills, of which the following is a specification:

Figure 1 is partly a side elevation and partly a sectional elevation, and Fig. 2 is a plan view, of apparatus for carrying out my invention.

Similar letters of reference indicate corresponding parts.

A A represent the "water-riffle" sluice. C C C are the open slits or water-riffles cut through the bottom of this sluice into the tank. B B is the tank of standing water, with its several water-tight compartments, a a a. D D is the stratifying-sluice; E E, the "tail-blade" inserted in the lower end of this sluice.

The object of the invention is to provide a simple, cheap, and more thorough mode of separating from the mass of barren sand the gold and silver bearing sulphurets, fine particles of amalgam, quicksilver, &c., escaping in the tailings from quartz-mills.

The nature of the invention consists in first causing the mingled sands, sulphurets, quicksilver, and water to flow through a wide and shallow sluice with small transverse slits or perforations, called "riffles," cut through its bottom, each riffle opening into a capacious tank or vessel, filled with standing water, underneath, so arranged that the still water in the tank comes up through and stands in these open riffles in the bottom of the sluice, forming therein a water-bottom, and effectually preventing any of the running water of the sluice from passing through the riffles into the tank. In passing over these water-riffles the coarser and heavier sulphurets and globular quicksilver, by reason of their slow, dragging motion on the bottom of the sluice and superior weight specifically, sink through these water-spaces into the tank and are saved, while most of the sand and some of the exceedingly fine and light sulphurets and minute particles of "floured" quicksilver are carried on through the sluice by the current. After passing through this water-riffle sluice the current flows into another sluice of reverse form, called the "stratifying-sluice," this latter being very narrow and deep, long, straight, true, smooth, and unobstructed throughout its entire length, and the current passing through under a slight head. In flowing the entire length of this sluice with a slow and uniform motion, the sands gradually arrange themselves into different horizontal strata, according to the coarseness of their grains, the fine sulphurets, minute particles of quicksilver, &c., finding their way to the bottom of the sluice among the moving grains of the coarsest sand. Near the bottom of this deep narrow sluice, at the lower end, is inserted a very thin sheet of metal, called the "tail-blade," which divides the running current horizontally, cutting off the lowest stratum of coarse sand, containing the fine sulphurets, &c., from the main body of the flowing sands above it without disturbing the current, so as to discharge the former into a separate vessel or reservoir. These very fine sulphurets, &c., are then easily separated from the coarse sand by passing them through any ordinary fine screen.

Having thus described the general features and operation of the invention, I will now describe more particularly some of its essential parts.

The water-riffle sluice should be wide and shallow, and made something like the blanket-sluices now generally in use near Virginia City, Nevada. It may be left open at top and laid with a gentle fall, or it may be horizontal and closed at top and worked under a small head; but it is more convenient using it open, as shown in Figs. 1 and 2 in the accompanying drawings. In that case it should be perfectly true and straight, entirely level in its cross-section, have a fall of about one-quarter of an inch to the foot, (a little more or less,) and a length of at least fifty or sixty feet before reaching the water riffles and tank. The riffles or openings through the bottom of the sluice into the tank may be in the form of perforations through a thin metal bottom, if desired; but if the sluice have a continuous fall the best form is that of the narrow transverse slits described in the drawings; and the best way of making these riffles is to make that part of the sluice-bottom which passes over the tank of separate plates or pieces of wood, iron, or other suitable material, each piece being cut long enough to reach across the sluice, and, say, one foot or more in width. These pieces I call the "riffle-plates." Lay these plates near enough together to leave a slit or opening of about one-sixteenth of an inch (more or less) between each. These slits form the riffles. The ends of these plates rest on two girders of wood or iron extending the entire length of the tank under each side of the sluice; or, if the tank be no wider than the sluice, the ends of these plates rest, water-tight, on the sides of the tank, as seen at Fig. 2 in the drawing. If the sluice over the tank have a continuous fall the tank is divided by water-tight partitions into separate water-tight compartments, one under each slit or riffle, and the center of each riffle-plate (lengthwise) is laid on and screwed fast to the top of one of the partitions which run across the tank, thus making each compartment of the tank under the riffle-plates water-tight, so that no water can pass from one compartment of the tank to the other, no water enter the tank after it is once filled, and no water escape from it except as it is gradually displaced by the falling sulphurets, and rises up through the riffles. These water boxes or compartments may be left open at the top and extend out wider than the sluice, if preferred, in which case the sides should be an inch or two higher than the upper surface of the riffle-plates, so that the water shall stand in the tank fully as high as the surface of the running water in the sluice, and prevent by its counter hydrostatic pressure any of the sluice-water from passing through the riffles and carrying light sand with it into the tank; but I think it much better to have each compartment covered tightly on the top, as before described.

It is only when the sluice has a continuous fall that I limit the riffle-openings to one for each compartment of the tank; but, if it is desired, that portion of the sluice over the tank may be made level, or have level sections, in which case there need be but one compartment of tank for each level space in the sluice, and nearly the whole of each level section of the sluice may consist of small riffle-openings, either in the form of transverse slits, perforations, or the interstices of fine wire screens; but, if a thin metal or wire screen is used, care must be taken to have it so stretched and supported by a frame underneath that the surface shall be entirely level, and set so that the still water of the tank shall stand in the openings or interstices up to the surface of the metal. The tank may be of any depth desired, but should have a depth of several feet, so that it may contain a large quantity of sulphurets, &c., before requiring to be discharged. The bottom of one side of the tank is held on with clamps and keys, so that it may be readily opened to discharge the sulphurets, &c., when full. The tank is filled with water through the open riffles by letting clear water into the sluice and slightly damming it below the riffles. These water riffles and compartments may be extended to any number desired; but, in ordinary cases, twenty or thirty feet length of tank will be as much as will prove useful. For, as before stated, there will always be a residuum of very fine and light metallic particles moving too rapidly with the current to permit them to sink into these fine water-riffles; they pass on with the sands into the stratifying-sluice, the form and operation of which have already been partially described. This sluice is exceedingly narrow, and proportionately deep; yet it may be made of any capacity desired—say two feet deep and two inches wide, or one foot deep by one inch wide. This sluice should be several hundred feet long, perfectly straight, true, smooth, and uniform its entire length, and entirely open at its lower end, so that there shall be no obstruction to the free horizontal flow of every portion of the current till finally discharged at the mouth. This also may be used open at top, and laid with a gentle fall; but I think it better to close the top, lay the sluice nearly level, and have the current given by a head through a short penstock or head-box, as represented in the drawing.

The head and velocity of the current should be just sufficient to keep all the sands open and moving, no more. The tail-blade (shown in detail at E E) is a thin metal partition, a little wider than the sluice, the upper end of which is slid into the mouth of the sluice (by means of horizontal grooves cut in the end) to such a distance that the current at that point is not disturbed by the fall at the mouth. It should be inserted from half an inch to two inches from the bottom of the sluice, the height depending on the narrowness of the sluice in proportion to its depth and the amount of sands running.

It is well to have several sets of grooves cut in the end of the sluice, at different distances from the bottom, so that the position of the tail-blade may be easily changed when found necessary. The upper end of the tail-blade should be nearly horizontal, and that portion projecting outside the end of the sluice curved downward to conform to the natural fall of the water as it issues from the mouth of the sluice, so that it shall neither obstruct nor accelerate the flow of any portion of the current at the point where the strata are divided. Outside the end of the sluice the discharging current is inclosed at the sides in a box for a short distance, to prevent the strata mingling as they fall, the curved portion of the tail-blade forming either the bottom or the top of this box.

The contents of the bottom stratum, cut off by the tail-blade, fall into the box or reservoir G, and consisting mainly of coarse grains of sand and very fine sulphurets, floured quicksilver, &c., the latter can be easily separated by passing them through a common fine wire-cloth screen.

Some tailings contain considerable chloride of silver in the light slimes which float near the surface of the current. Where this is the case I cut off the stratum containing these slimes, also, by inserting another tail-blade at the proper height for that purpose, and discharge this upper stratum into a separate reservoir.

The concentration is not complete and thorough without going through both the processes herein described, for, although the coarse sulphurets could be stratified along with the coarse sand in the stratifying-sluice, they could not be separated from those sands by screening, as the exceedingly fine sulphurets can, which are carried over the water-riffles.

I am aware it is not new to employ an ore washer or separator in which a running stream of water is maintained up through openings in the bottom of a sluice, and do not claim such means or method.

Having thus described my invention, what I claim as new, and desire to secure by Letters Patent, is—

The process of concentrating tailings of quartz-mills, consisting essentially in conducting the stream containing the tailings over a still body of water, the same standing in or filling openings in the conduit for said tailings, as set forth.

FRANCIS E. MILLS.

Witnesses:
IRA S. PARKE,
WILLIAM PARTRIDGE.